Oct. 3, 1961  E. SCHATZKI  3,002,342
MECHANISM FOR CONTROLLING RELATIVELY HIGH VELOCITY
FLOW OF FLUIDS LONGITUDINALLY THROUGH AND
LATERALLY FROM AMBULANT CONDUIT MEANS
Filed Aug. 12, 1953  5 Sheets-Sheet 2

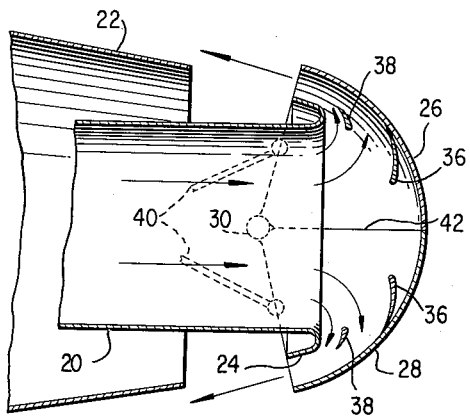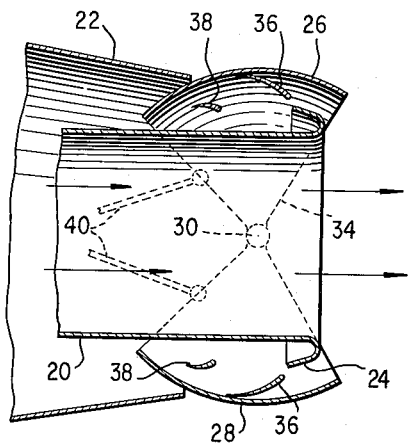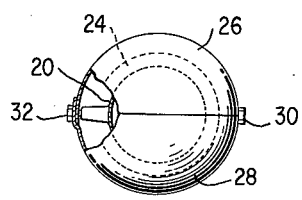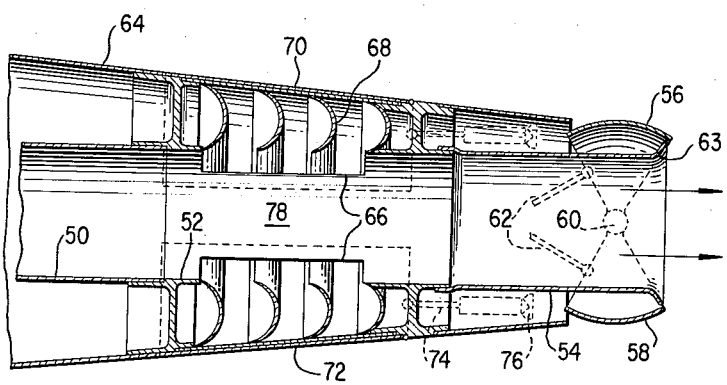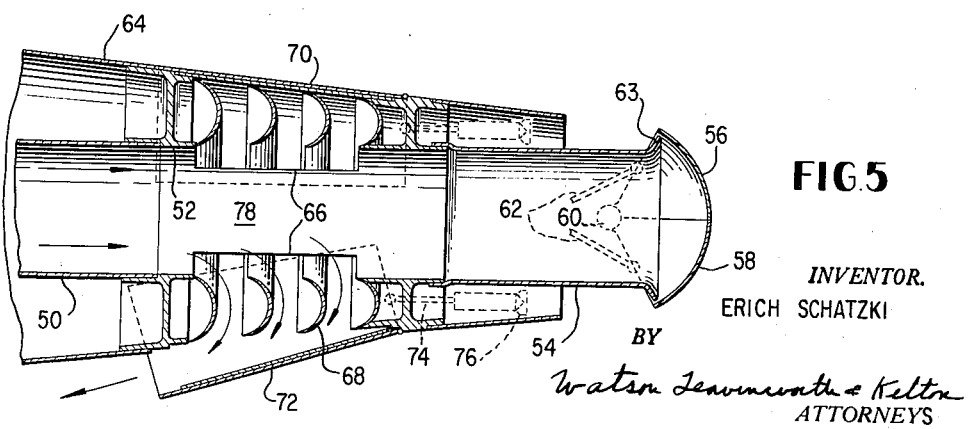

INVENTOR.
ERICH SCHATZKI
BY
Watson Leavenworth & Kelton
ATTORNEYS

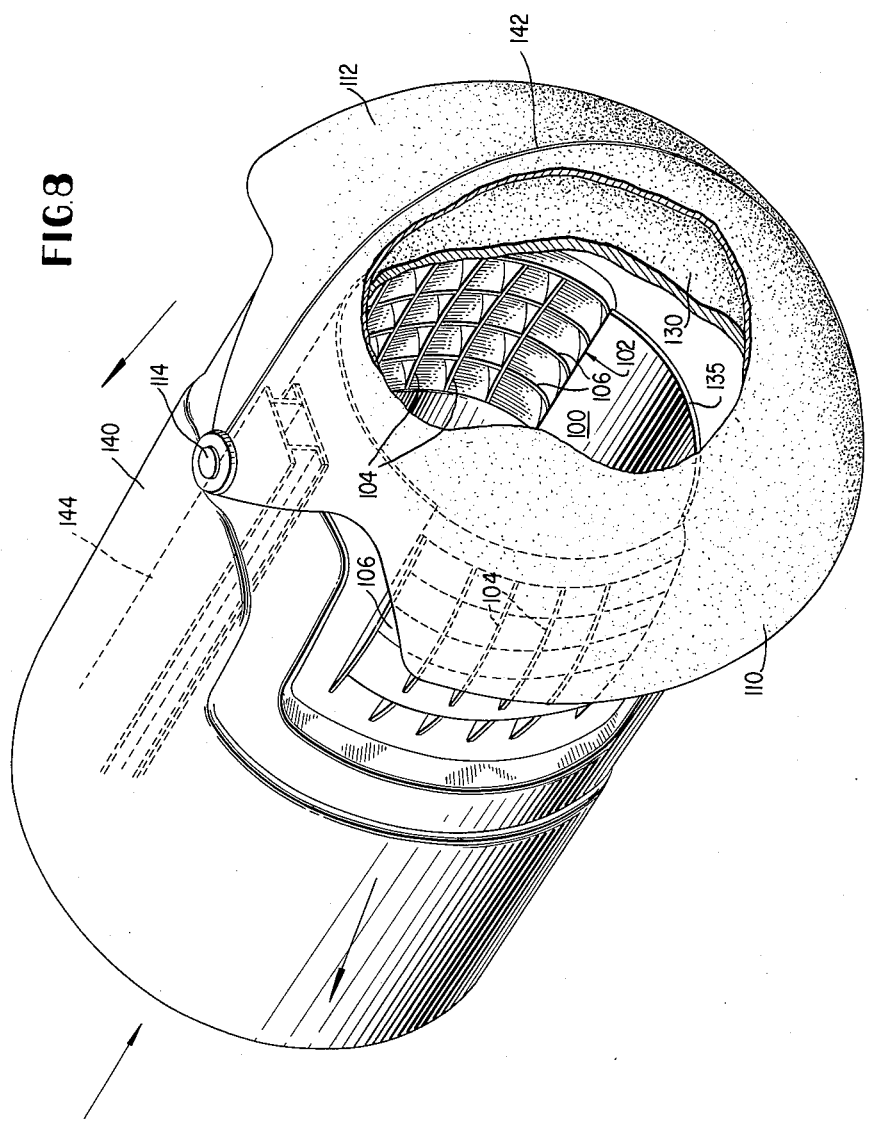

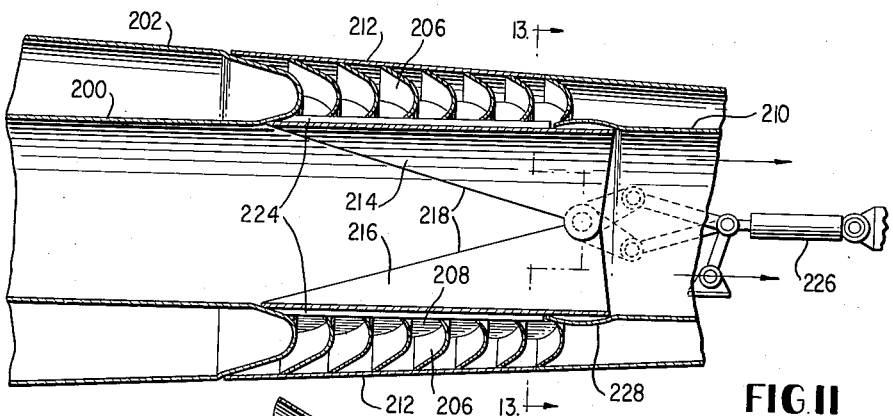
FIG.11
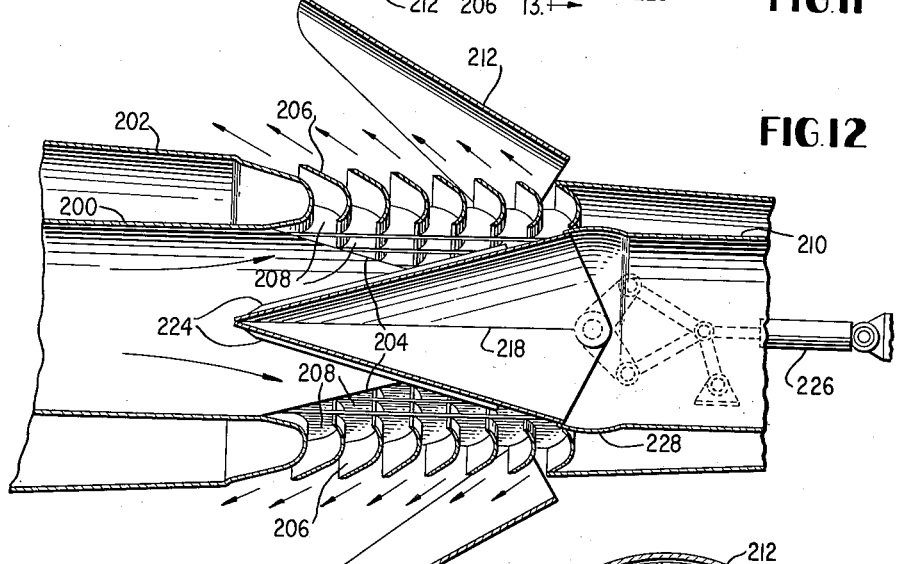
FIG.12
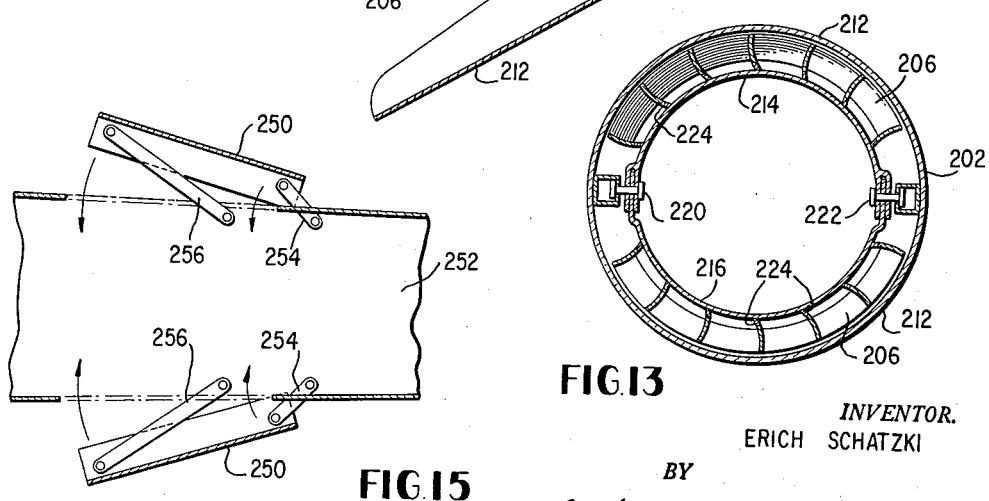
FIG.13
FIG.15
INVENTOR.
ERICH SCHATZKI
BY
Watson Leavenworth & Kelton
ATTORNEYS

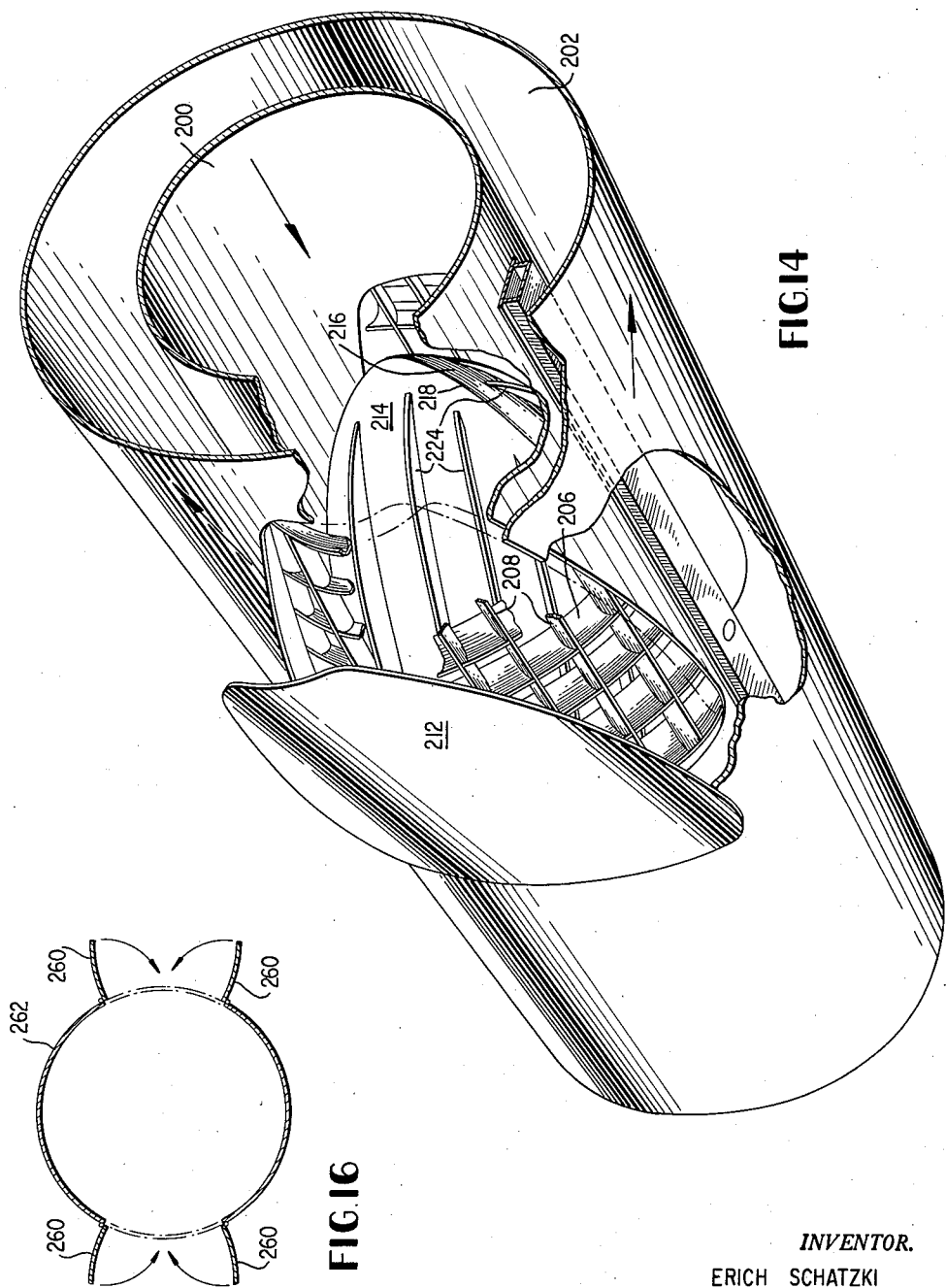

United States Patent Office 3,002,342
Patented Oct. 3, 1961

3,002,342
MECHANISM FOR CONTROLLING RELATIVELY HIGH VELOCITY FLOW OF FLUIDS LONGITUDINALLY THROUGH AND LATERALLY FROM AMBULANT CONDUIT MEANS
Erich Schatzki, 68—37 Yellowstone Blvd., Forest Hills, N.Y.
Filed Aug. 12, 1953, Ser. No. 373,724
20 Claims. (Cl. 60—35.54)

This invention relates to improvements in jet propelled craft, and more particularly in jet aircraft.

As the speed of airplanes increases, the problem of the ground run during landing becomes of paramount importance to the safety of the craft. This is particularly true when landing on improvised or emergency fields. However, even for runways which are normally adequate, pilot error, weather conditions, and brake failure may cause the plane to pass the limits of the field.

In the case of propeller planes, the reversal of the propeller is a satisfactory means for reducing the speed of the craft.

Drag chutes have been used for braking jet aircraft. However, chutes are cumbersome and do not deliver a constant force with decreasing airplane speeds.

It is an object of the invention to provide improved means for retarding jet propelled craft, particularly jet aircraft during the ground run.

It is another object of the invention to provide jet aircraft with retarding means, the effect of which is similar to that obtained in propeller aircraft by propeller reversal.

It is a further object of the invention to provide a retarding device for jet aircraft, which does not appreciably change the aerodynamic characteristics of the craft during forward flight, and which can be easily controlled.

According to the invention, a device is provided for reversing the direction of flow of jet gases so as to produce a negative thrust and obtain an effective retarding force.

Although the invention is of particular importance for jet aircraft, it may also be applied to other jet propelled craft.

Further objects, features and advantages of the invention will become apparent from the following description which is merely exemplary.

In the drawings,

FIG. 1 is a diagrammatic sectional view showing a first embodiment of the invention with the parts in position for normal flight.

FIG. 2 is a view similar to FIG. 1 but showing the parts in position for jet reversal.

FIG. 3 is an end view in the direction of the arrow A in FIG. 1 on a smaller scale, partly in section.

FIGS. 4 and 5 are diagrammatic sectional views showing a second embodiment of the invention in positions for normal flight and jet reversal, respectively.

FIG. 8 is a perspective view showing the third embodiment in position for jet reversal, certain portions of the device being broken away.

FIGS. 11 and 12 are diagrammatic sectional views showing a fifth embodiment in position for normal operation and jet reversal, respectively.

FIG. 13 is an enlarged section taken along line 13—13 of FIG. 11.

FIG. 14 is a perspective view showing the fifth embodiment in position for jet reversal, certain portions of the device being broken away.

FIGS. 15 and 16 show various details.

Figure 6:
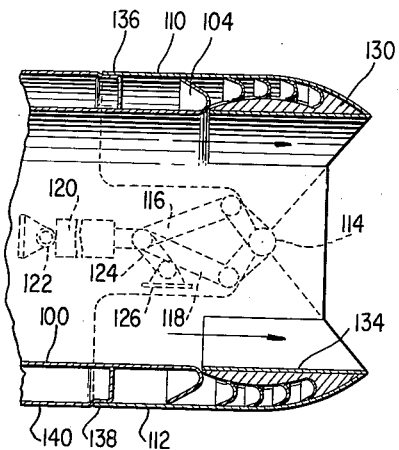
FIGS. 6 and 7 are diagrammatic sectional views showing a third embodiment of the invention in positions for normal flight and jet reversal, respectively.

Referring now to the drawings, FIGS. 1 to 3 illustrate the application of the invention to the tail pipe of jet aircraft and show a first embodiment in which a pair of movable members having vanes thereon are rotated into the path of the jet when retarding is required.

The tail pipe 20 is positioned within the fuselage skin 22 and has a flange 24 at its rear end. A pair of members 26, 28 are pivotally mounted at 30, 32 on or adjacent to the rear end of the tail pipe. These members 26, 28 are substantially segments of a hollow sphere and generally of clam shell shape, lugs 34 being provided thereon at the pivot points. Curved vanes 36, 38 are attached to members 26, 28 so that the vanes face the tail pipe. A control mechanism indicated at 40 serves to determine the position of the clam shell members selectively. The elements 40 may be actuated hydraulically or electrically.

In the position shown in FIG. 1, the rear end of the tail pipe is completely open to facilitate rearward discharge of exhaust gas during normal flight. The clam shell members 26, 28 are inoperative and their outer portions are spaced from each other. It will be clear that in this position members 26, 28 conform to the general shape of the fuselage skin so that they do not appreciably affect the aerodynamic characteristics of the plane during normal flight.

When retarding is required, members 26, 28 are moved by control elements 40 into their operative position shown in FIGS. 2 and 3. In this position, their outer portions abut each other along line 42 and close the path of the exhaust gas in the aft direction. However, the clam shell members are spaced from the tail pipe in such a manner that gas can now escape through gap 44 between clam shell members and tail pipe. With the aid of the curved vanes 36, 38 the gases are forced into the direction towards gap 44 and generally towards the front of the aircraft so that the thrust is approximately reversed and a very effective retarding action is obtained.

Flange 24 of the tail tube cooperates with the clam shell members and vanes in forming passageways and serves to guide the reversed exhaust gases in such a manner that the flow is spaced from the fuselage skin.

The direction of flow of exhaust gases is indicated by arrows in the drawings.

In the second embodiment shown in FIGS. 4 and 5, the closing of clam shell members causes exhaust gases to flow over guide means such as vanes mounted in a fixed position. The passages along the vanes are opened when the clam shell members are closed.

The exhaust tube structure comprises tail pipe 50, tubular member 52, and terminal pipe 54. Clam shell members 56, 58 are pivoted at 60 on opposite sides of terminal pipe 54 and are moved by means of control elements 62 in a manner similar to that described in connection with the first embodiment. However, the clam shell members 56, 58 substantially abut the rear end 63 of pipe 54 so that they are adapted to close the end of the pipe practically completely.

Tubular member 52 extends on its circumference to the fuselage skin 64 and has lateral openings 66 limited to parts of the circumference. Fixed guide means in the form of vanes or cascades 68 are disposed so as to lead from openings 66 towards the atmosphere but are covered by hinged doors 70, 72 in the inoperative position of the device as shown in FIG. 4, each of the doors is selectively movable by a separate control element 74 actuated by a separate means 76 such as a hydraulic or electric motor.

FIG. 5 illustrates one of the positions for jet reversal, in which certain of the vanes 68 are still covered. Clam shell members 56, 58 practically close the rear end of the exhaust tube, and door 72 is open while door 70 remains closed. This will divert the exhaust gases from their normal path and will cause the gases to escape over those of the vanes 68 which are associated with the open door 72, in such a way that the direction of flow of the jet stream is substantially reversed. At the same time, due to the unsymmetrical escape of gases a resultant force perpendicular to the axis of the exhaust tube is created. If this resultant force passes through the center of gravity of the aircraft, a combined retarding and lifting effect will be obtained. On the other hand, an arrangement of the parts in which the resultant force bypasses the center of gravity, will result in a combined retarding and controlling effect.

If both doors 70 and 72 are opened simultaneously and clam shell members 56, 58 are closed, the thrust will be substantially reversed to retard the craft without creating any lifting or controlling force.

Wall portions 78 of tubular member 52, which extend between openings 66, prevent the flow of reversed exhaust gases along predetermined regions of the aircraft. In this way, parts of the craft such as the stabilizer may be protected against impact of exhaust gases. If one wall portion 78 is provided for such purpose, a corresponding opposite portion 78 is arranged so that balanced symmetrical discharge of gases will be obtained with all doors 70, 72 in open position.

As will be clear from the drawing, doors 70, 72 project beyond the aircraft structure in their open or operative position and are disposed at an angle to the axis of the exhaust tube, i.e., generally to the longitudinal direction of the craft, so that the doors will have a drag effect in addition to the retarding effect of reversed exhaust gases. If desired, the doors may be opened with the engine shut off to obtain a drag effect without thrust reversal.

Figure 7:
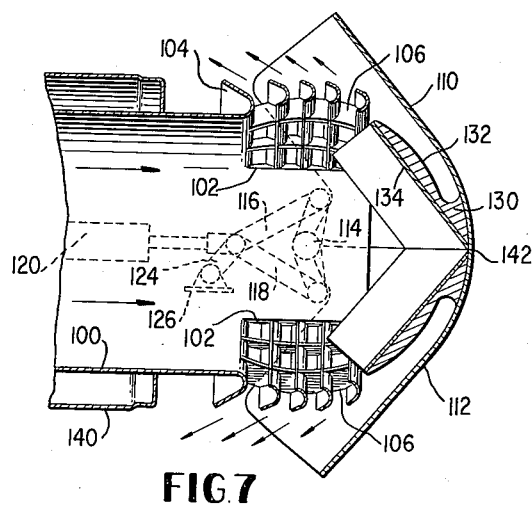

FIGS. 6 to 8 illustrate the third embodiment in which one set of pivoted members serve for controlling the rear end of the tail pipe, as well as for controlling fixed vane passages, and at the same time may be shaped to have a drag effect.

Tail pipe 100 is provided with a pair of opposite lateral openings 102 adjacent to its rear end, the openings extending over parts of the circumference of the pipe. Fixed vanes or cascades 104 register with openings 102 and are supported by longitudinal ribs 106 connected to the pipe and vanes, for example, by welding.

A pair of members 110, 112 are pivoted at 114 on opposite sides of the pipe and controlled by a mechanism including a link 116 connected to member 110 and a link 118 connected to member 112. Both links are actuated by a hydraulic motor 120 or the like which is pivotally mounted at 122. A guide link 124 (FIG. 7) mounted on a fixed support 126 serves to take up any side thrust in the control mechanism.

Each of the members 110, 112 is provided with an internal filler piece 130 which fits into openings 102 and has a face 132 of spherical shape. The vanes 104 conform to this spherical shape at their inner circumference. Further, each filler piece has a generally round inner face 134 which substantially conforms to the internal shape of pipe 100.

In the inoperative or open position shown in FIG. 6, the guide vanes 104 are embraced by members 110, 112 and their filler pieces 130. The spherical faces 132 abut the inner circumference of vanes 104 to close openings 102, and the round inner faces 134 of the filler pieces form an internal extension of the main portion of pipe 100. Thus, the exhaust gases can escape freely through the unobstructed rear opening 135. Members 110, 112 cooperate at their ends 136, 138 with the fuselage skin 140 to form a smooth outer surface.

In the operative or closed position shown in FIG. 7, the rear end of the pipe is closed by members 110, 112 and their filler pieces 130 which abut each other as indicated at 142, while the passages along vanes 104 are open so that the jet stream will be reversed and the craft will be efficiently retarded. At the same time, members 110, 112 project in this position at their ends 136, 138 beyond the aircraft structure so that a drag effect will be obtained in addition to the thrust reversal. Ribs 106 will rectify any tendency of reversed exhaust gases to swirl.

The operative position of the parts is further illustrated in the perspective view of FIG. 8 which diagrammatically shows a device of the same general type as FIGS. 6 and 7. Certain parts such as control connections have been omitted in the perspective view for better illustration. A structural member supporting a pivot for members 110, 112 is indicated 144 in FIG. 8.

Figure 9:
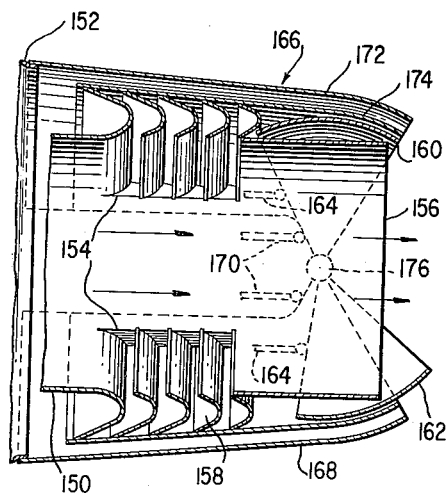
FIGS. 9 and 10 are diagrammatic sectional views showing a fourth embodiment suitable for aircraft equipped for operation with and without after-burners, in various positions.
Figure 10:
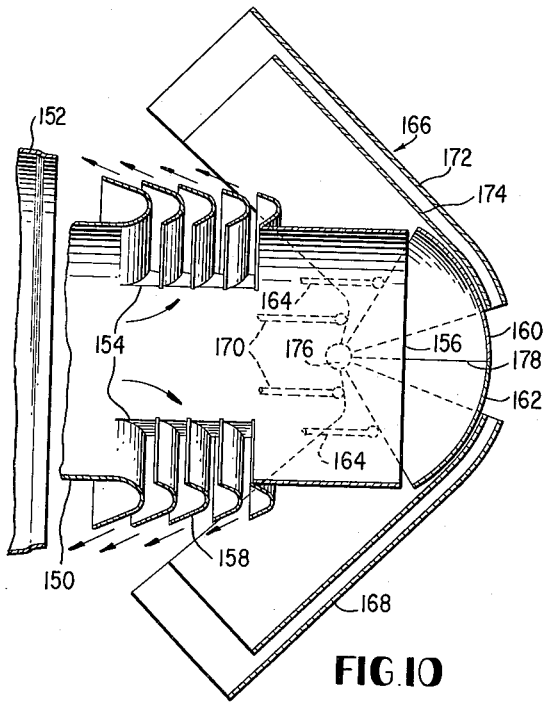

The fourth embodiment shown in FIGS. 9 and 10 deals with the application of the invention to aircraft equipped with an afterburner. In such aircraft, clam shell members have been used to open the exhaust tube fully when the afterburner is in operation, and to restrict the exhaust passage partly during operation without afterburner. The invention may be used in combination with such variable nozzle arrangement by providing an additional position for the clam shell members and modifying the device in such a manner that the thrust of the jet is reversed in the new position as will now be described. At the same time, this embodiment provides means for combining a cooling passage of conventional type with the retarding device.

Tail pipe 150 is mounted in the fuselage structure 152 and provided with a pair of opposite lateral openings 154 at a certain distance from its rear end 156. Reversing vanes 158 are provided on the pipe and register with openings 154. A first movable means comprising a pair of clam shell members 160, 162 is controlled in unison by elements 164, and a second movable means comprising a pair of cover members generally indicated at 166, 168 is controlled in unison by elements 170. Each of the pivoted members 166, 168 has an outer wall 172 and an inner wall 174 which are connected by spacers or the like (not shown). The clam shell members and cover members are pivotally mounted on opposite sides of the tube as indicated at 176.

In the inoperative or initial position of the device shown in the upper half of FIG. 9, the passages along guide vanes 158 are closed by the inner walls 174 of cover members 166, 168, and the rear opening of tube 150 is unrestricted as required for operation with afterburner. Clam shell members 160, 162 are nested in the cover members 166, 168, respectively.

The outer circumference of pipe 150 and the surrounding structure 152 form a passageway therebetween through which air for cooling the exhaust pipe is drawn in certain conventional arrangements, due to the action of jet gases leaving the tail pipe. To obtain such ejector-like effect in the improved device, the double walls 172, 174 form an extension of the air passage in the position of members 166, 168 shown in FIG. 9, so that the passage is continued to the rear end of pipe 150 and discharged exhaust gases may cause air to flow between pipe 150 and structure 152.

In the intermediate position shown in the lower half of FIG. 9, the pivoted clam shell members have been rotated through a predetermined angle in such a manner that the exhaust opening is partly restricted as required for operation without afterburner. Only member 162 is shown in the lower half of Fig. 9 but member 160 will be rotated in a corresponding manner.

In the advanced position according to FIG. 10, the clam shell members 160, 162 abut each other at 178 and effectively close the rear end of pipe 150. Cover members 166, 168 have been moved so as to open the passages along vanes 158, and the jet gases will be substantially reversed to retard the craft. Since in this position the cover members 166, 168 project beyond the aircraft structure at angle to the longitudinal axis thereof, a drag effect will be obtained.

The fifth embodiment shown in FIGS. 11 to 14 differs from other forms of the invention mainly in that pivoted members are mounted within the exhaust tube.

In other respects, the arrangement is similar to certain embodiments described hereinbefore and includes a tail pipe 200 mounted in the fuselage structure 202, openings 204 in the pipe, reversing vanes or cascades 206 supported by longitudinal ribs 208 which connect the main portion of pipe 200 to its rear part 210, and hinged doors 212 which may be moved hydraulically or electrically.

A pair of members 214, 216 arranged within the pipe are pivoted at 220, 222. These members can be regarded as portions of a hollow cylinder, the inner circumference of which conforms to the inner shape of pipe 200, each member having been cut from the cylinder in a plane through the respective oblique face 218. Generally, the pivoted members 214, 216 are shaped and opened and closed like the parts of a beak. Longitudinal ribs 224 (see particularly FIG. 14) are provided on the beak members and are aligned with longitudinal ribs 208 on the pipe structure.

Control mechanism generally indicated at 226 serves to selectively determine the position of the beak members and generally comprises the same parts as described in connection with FIGS. 6 and 7.

The rear part 210 of the exhaust pipe has a spherical portion 228 to closely accommodate the base of each beak member 214, 216 during movement thereof. Openings 204 have a curved circumference corresponding to the shape of the beak members.

In the inoperative position shown in FIGS. 11 and 13, the beak members fit into and close openings 204 and thus also close the passages along vanes 206, the outer doors 212 being closed at the same time. The passage of gas through pipe 200 is unobstructed so that gas can freely escape in the aft direction.

In the operative position shown in FIG. 12 and the diagrammatic perspective view of FIG. 14, the doors 212 are open. The beak members are tilted towards the axis of pipe 200 and abut each other at their faces 218 so as to form a tapered body pointing into the oncoming stream of exhaust gas. Since the tilted beak members extend towards the openings 204 and vanes 206 and close the normal passage leading through pipe 200, they will very effectively direct the jet stream towards the vanes and thus cause substantial reversal of the direction of flow of the gas. Any swirling tendency of reversed gases will be rectified by longitudinal ribs 208 and 224.

The mounting of the beak members 214, 216 within the pipe is such that after a short initial movement from the inoperative position the members are inclined towards the axis of the pipe and automatically tend to assume their operative position due to the impact of exhaust gas thereon. This will reduce the required control force and increase the safety in operation.

FIGS. 15 and 16 illustrate various forms of outer doors which may be used in arrangements such as the second or fifth embodiment. The doors 250 according to FIG. 15 are mounted on the fuselage 252 by means of links 254, 256. Arrows indicate the direction of the closing motion. Since the doors project beyond the fuselage considerably in the open position and are disposed at an angle to the longitudinal axis of the fuselage, a substantial drag effect will be obtained.

Referring to FIG. 16, the double doors 260 mounted on the fuselage 262 are arranged to avoid any substantial drag effect since the wings of the doors extend in their open position approximately parallel to the longitudinal axis of the fuselage. The wings are closed in the direction indicated by arrows.

It is to be understood that details of the construction may be changed without departing from the spirit of the invention as defined in the appended claims. For example, longitudinal ribs on the vanes have been shown only in certain embodiments but may also be used in other modifications. Further, the exhaust device according to the invention has been illustrated as mounted on tail pipe structures but may likewise be applied to pod structures. Furthermore, the improved retarding device may be used not only during ground runs but also while the aircraft is still in flight. Parts such as outer doors which create drag in the open position may be used as dive brake.

Having described my invention, what I claim and desire to secure by Letters Patent is:

1. Mechanism for controlling relatively high velocity flow of fluids through and from ambulant conduit means to apply reverse and side thrust selectively to the conduit means comprising, in combination, a conduit section to define a through path of relatively high velocity fluid flow, means providing lateral outlet openings at least on opposite sides of said section, adjustable flow retarding means movable into the flow path through said section to initiate diverted flow to said lateral openings, flow-directing vanes mounted in said lateral openings, a plurality of separate outside door means each independently associated with one of said vane-equipped lateral openings to cover and uncover it in varying degrees and selectively control flow therefrom, and means independently to operate said outside door means selectively to control flow from the vane-equipped lateral openings selectively to apply reverse and side thrust to said conduit sections.

2. Mechanism for controlling relatively high velocity flow of fluids through and from ambulant conduit means comprising, in combination, a conduit section to define a through path of relatively high velocity fluid flow and having upstream and downstream end portions, means providing at least a pair of separately-defined lateral outlet openings relatively located across on opposite sides of said section, a cascade of flow-directing vanes mounted in each of said lateral openings providing therebetween flow passages having inlets communicating with the through flow path and outlets exterior of said conduit section, adjustable flow retarding means movable into the flow path through said section to initiate diverted flow to the inlets of said vane-defined passages, at least a pair of separate outside doors each independently associated with one of said vane-equipped lateral openings to cover and uncover in varying degrees the outlets of the vane-defined passages of this particular lateral opening to control flow of the diverted fluid from the passage outlets, means to operate and adjust said flow retarding means, and operating means independent of said means for operating said flow retarding means for selectively operating said outside doors independently of the operation of said flow retarding means.

3. Mechanism for controlling relatively high velocity flow of fluids through and from ambulant conduit means comprising, in combination, a conduit section to define a through path of relatively high velocity fluid flow and having upstream and downstream end portions, means providing at least a pair of separately-defined lateral outlet openings relatively located across on opposite sides of said section, a cascade of flow-directing vanes mounted in each of said lateral openings providing therebetween flow passages having inlets communicating with the through flow path and outlets exterior of said conduit section, adjustable flow retarding means movable into the flow path through said section to initiate diverted flow to the inlets of said vane-defined passages, at least a pair of separate outside doors each independently associated with one of said vane-equipped lateral openings to cover and uncover in varying degrees the outlets of the vane-defined passages of this particular lateral opening to control flow of the diverted fluid from the passage outlets, means swingably mounting each of said doors to the exterior of said conduit section, means to operate and adjust said flow retarding means, and operating means independent of said means for operating said flow retarding means for selectively operating said outside doors independently of the operation of said flow retarding means.

4. Mechanism for controlling relatively high velocity flow of fluids through and from ambulant conduit means comprising, in combination, a conduit section to define a through path of relatively high velocity fluid flow and having upstream and downstream end portions, means providing at least a pair of separately-defined lateral outlet openings relatively located across on opposite sides of said section, a cascade of flow-directing vanes mounted in each of said lateral openings providing therebetween flow passages having inlets communicating with the through flow path and outlets exterior of said conduit section, adjustable flow retarding means movable into the flow path through said section to initiate diverted flow to the inlets of said vane-defined passages, at least a pair of separate outside doors each independently associated with one of said vane-equipped lateral openings to cover and uncover in varying degrees the outlets of the vane-defined passages of this particular lateral opening to control flow of the diverted fluid from the passage outlets, means swingably mounting each of said doors to the exterior of said conduit section about a transverse axis with the upstream leading end of this door being swingable away from and toward the passage outlets and with the inner side of said door directing reverse flow upstream exteriorly of said tube section, means to operate and adjust said flow retarding means, and operating means independent of said means for operating said flow retarding means for selectively operating said outside doors independently of the operation of said flow retarding means.

5. Mechanism for controlling relatively high velocity flow of fluids through and from ambulant conduit means comprising, in combination, a conduit section to define a through path of relatively high velocity fluid flow and having upstream and downstream end portions, means providing at least a pair of separately-defined lateral outlet openings relatively located across on opposite sides of said section, a cascade of flow-directing vanes mounted in each of said lateral openings providing therebetween flow passages having inlets communicating with the through flow path and outlets exterior of said conduit section, adjustable flow retarding means movable into the flow path through said section to initiate diverted flow to the inlets of said vane-defined passages, at least a pair of separate outside doors each independently associated with one of said vane-equipped lateral openings to cover and uncover in varying degrees the outlets of the vane-defined passages of this particular lateral opening to control flow of the diverted fluid from the passage outlets, means movably mounting each of said doors to the exterior of said conduit section for laterally-outward motion of at least a portion of said door away from said section, means to operate and adjust said flow retarding means, and operating means independent of said means for operating said flow retarding means for selectively operating said outside doors independently of the operation of said flow retarding means.

6. The flow control mechanism as defined in claim 5 characterized by said door mounting means as comprising hinge means pivotally mounting the downstream trailing ends of said doors to said conduit section whereby the upstream leading ends of said doors may be pivoted outwardly to extended positions.

7. The flow control mechanism as defined in claim 5 characterized by said adjustable flow retarding means as comprising a plurality of inner doors each in a radially-outermost position covering the vane-defined passage inlets of one of said lateral openings and means swingably mounting each of said doors to the interior of said conduit section with the upstream leading end of this inner door being swingable away from the passage inlets into the conduit-defined flow path.

8. The flow control mechanism as defined in claim 7 characterized by said plurality of inner doors having their upstream leading ends shaped complementary to each other and abuttable with swing toward each other substantially to close off downstream flow through said conduit section with diversion thereof through the lateral openings.

9. The flow control mechanism as defined in claim 8 characterized by said outer and inner doors being provided in opposed pairs with two diametrically-opposed lateral openings being formed each to be flow-controllably covered and uncovered by one each of said inner and outer doors.

10. The flow control mechanism as defined in claim 9 characterized by said conduit section being substantially cylindrical with each of said lateral openings being of generally triangular shape with the apex thereof located upstream as may be provided by an oblique plane of severance to define the apex and side edges thereof with the downstream edge thereof extending substantially transversely of said cylindrical section, said inner and outer doors being similarly shaped.

11. The flow control mechanism as defined in claim 10 characterized by said vanes extending transversely across said triangular lateral openings and being curved forwardly with their trailing ends at the passage outlets extending upstream.

12. The flow control mechanism as defined in claim 11 characterized by longitudinally-extending, subdividing radially-oriented, relatively flat fins tying said vanes together to form therewith a grid structure, each of at least some of the passages thereby being defined by a pair of longitudinally-spaced vanes and a pair of transversely-spaced fins.

13. The flow control mechanism as defined in claim 12 characterized by said conduit section as comprising inner and outer coaxially-arranged and appreciably radially-spaced tubular members with said vanes and fins extending substantially from one to the other, each of said inner triangular doors seating snugly in its respective triangular lateral opening in the inner tubular member with its inside surface being substantially flush with the inside surface of said inner tubular member, each of said outer doors having similar seating in its triangular lateral opening in the outer tubular member with similar flush disposition of the outside surfaces thereof.

14. The flow control mechanism as defined in claim 5 characterized by said flow retarding means being in the form of pivoted clam shells pivotally mounted to the downstream end portion of said conduit section, said vane-equipped lateral openings being located upstream of said clam shells.

15. The flow control mechanism as defined in claim 14 characterized by said conduit section having radially-spaced inner and outer walls providing therebetween flow space for cooling mediums, said clam shells being pivotally mounted and telescoping over said inner wall in the retracted position out of the through flow path, said outer doors being of double wall construction to provide interiorly thereof when closed continuations of the cooling medium flow space.

16. The flow control mechanism as defined in claim 5 characterized by said means movably mounting each of said doors to said conduit section for laterally-outward motion as comprising parallel motion means.

17. The flow control mechanism as defined in claim 16 characterized by said parallel motion means as comprising upstream link means pivotally mounted to the upstream leading end portion of each of said doors and to said conduit section in the vicinity of the upstream end of the lateral opening covered by said door, and additional link means pivotally mounted to the downstream trailing end portion of each of said doors and to said conduit section in the vicinity of the downstream end of the lateral opening covered by said door.

18. The flow control mechanism as defined in claim 17 characterized by said upstream and downstream link means being pivotally mounted to said doors and conduit section about transverse axes with the upstream link means being longer than the downstream link means.

19. The flow control mechanism as defined in claim 5 characterized by said doors being pivotally mounted about longitudinally-extending axes to dispose them substantially parallel to slip stream.

20. The flow control mechanism as defined in claim 19 characterized by the door structure for covering and uncovering each lateral opening in said conduit section as comprising a pair of cooperating wings pivoted to swing in toward each other for closure of the lateral opening and swing out away from each other and the lateral opening to uncover the latter.

References Cited in the file of this patent

UNITED STATES PATENTS

| | | |
|---|---|---|
| 1,572,812 | Rees | Feb. 9, 1926 |
| 2,418,488 | Thompson | Apr. 8, 1947 |
| 2,510,506 | Lindhagen et al. | June 6, 1950 |
| 2,620,622 | Lundberg | Dec. 9, 1952 |
| 2,681,548 | Kappus | June 22, 1954 |

FOREIGN PATENTS

| | | |
|---|---|---|
| 1,020,287 | France | Nov. 12, 1952 |
| 860,754 | Germany | Dec. 22, 1952 |